US012651419B2

(12) United States Patent
Garcia Dorado et al.

(10) Patent No.: US 12,651,419 B2
(45) Date of Patent: Jun. 9, 2026

(54) LOCATION-SPECIFIC THREE-DIMENSIONAL MODELS RESPONSIVE TO LOCATION-RELATED QUERIES

(71) Applicant: Google LLC, Mountain View, CA (US)

(72) Inventors: Ignacio Garcia Dorado, Berlin (DE);
Charles Goran, Lafayette, CO (US);
Jordi Serrano Berbel, Berlin (DE);
Luke Barrington, Berlin (DE); Bilawal Singh Sidhu, Austin, TX (US);
Thomas Windheuser, Zürich (CH);
Thomas Robert Escobar, Boulder (CO); Jan Stria, Berlin (DE)

(73) Assignee: GOOGLE LLC, Mountain View, CA (US)

( * ) Notice: Subject to any disclaimer, the term of this patent is extended or adjusted under 35 U.S.C. 154(b) by 24 days.

(21) Appl. No.: 18/403,409

(22) Filed: Jan. 3, 2024

(65) Prior Publication Data

US 2024/0135658 A1    Apr. 25, 2024

Related U.S. Application Data

(63) Continuation of application No. 17/227,871, filed on Apr. 12, 2021, now Pat. No. 11,922,582.

(51) Int. Cl.
G06T 19/00 (2011.01)
G06T 7/11 (2017.01)

(52) U.S. Cl.
CPC .............. G06T 19/006 (2013.01); G06T 7/11 (2017.01); G06T 19/003 (2013.01); G06T 2210/64 (2013.01)

(58) Field of Classification Search
CPC ....... G06T 19/006; G06T 7/11; G06T 19/003; G06T 2210/64; G06T 19/00; G06T 17/20;
(Continued)

(56) References Cited

U.S. PATENT DOCUMENTS 8,562,439 B2    10/2013 Shuman et al.
10,755,112 B2 *  8/2020 Mabuchi .............. G06V 10/774
(Continued)

FOREIGN PATENT DOCUMENTS

JP      2002/287616      10/2002
JP      2009134280       6/2009
(Continued)

OTHER PUBLICATIONS

International Search Report and Written Opinion for Application No. PCT/US2022/018915, mailed May 31, 2022, 13 pages.
(Continued)

*Primary Examiner* — Jeffery A Brier
(74) *Attorney, Agent, or Firm* — DORITY & MANNING P.A.

(57) ABSTRACT

Generating a location-specific three-dimensional model in response to a location query can provide users with a better understanding of a location through providing better inter-activity, better perspective, and better understanding of dimensionality. Generation of the models can be enabled by leveraging a three-dimensional asset database and segmentation methods. The location-specific models can provide further utility by further including situation specific simulated effects, such as simulated weather or traffic.

19 Claims, 13 Drawing Sheets

1100

1102

MONT SAINT-MICHEL
ALL  LATEST  STREET VIEW & 360°  VIDEOS

1104

1106

1108

1110

1112

MONT ST MICHEL
LE MONT-ST-MICHEL IS A TIDAL ISLAND, AND MAINLAND COMMUNE IN NORMANDY, FRANCE.

(58) Field of Classification Search

CPC ......... G06T 17/00; G06T 17/05; G06T 15/10; G06T 15/00; G06T 7/00; G06T 2215/16; G06F 16/9537; G06F 2111/18; G06F 3/0481; G06F 3/04817; G06F 9/4443; G06F 3/04847; G06F 11/3664; G06F 3/012; G06F 3/0304; G06F 3/011–015; G06F 16/444; G06V 20/20; H04N 5/272; H04N 2201/3245; A63F 13/10

See application file for complete search history.

(56) References Cited

U.S. PATENT DOCUMENTS

| | | | |
|---|---|---|---|
| 11,922,582 B2* | 3/2024 | Dorado | G06T 19/006 |
| 2004/0193369 A1 | 9/2004 | Kokojima et al. | |
| 2007/0282792 A1 | 12/2007 | Bailly et al. | |
| 2010/0118025 A1 | 5/2010 | Smith et al. | |
| 2013/0097197 A1 | 4/2013 | Rincover et al. | |
| 2013/0346916 A1 | 12/2013 | Williamson et al. | |
| 2014/0245151 A1* | 8/2014 | Carter | G11B 27/34 715/720 |
| 2018/0144458 A1 | 5/2018 | Xu et al. | |
| 2019/0347854 A1 | 11/2019 | Karlov et al. | |
| 2020/0302241 A1 | 9/2020 | White et al. | |
| 2021/0097691 A1 | 4/2021 | Liu | |
| 2022/0327785 A1 | 10/2022 | Dorado et al. | |

FOREIGN PATENT DOCUMENTS

| | | |
|---|---|---|
| JP | 2010060712 | 3/2010 |
| KR | 2008/0007437 | 1/2008 |

OTHER PUBLICATIONS

International Preliminary Report of Patentability for PCT/US2022/018915, mailed on Oct. 26, 2023, 8 pages.

https://www.youtube.com/watch?v=q2DSXNEqStQ, retrieved on Jan. 3, 2024, 2 pages.

* cited by examiner

<u>300</u>

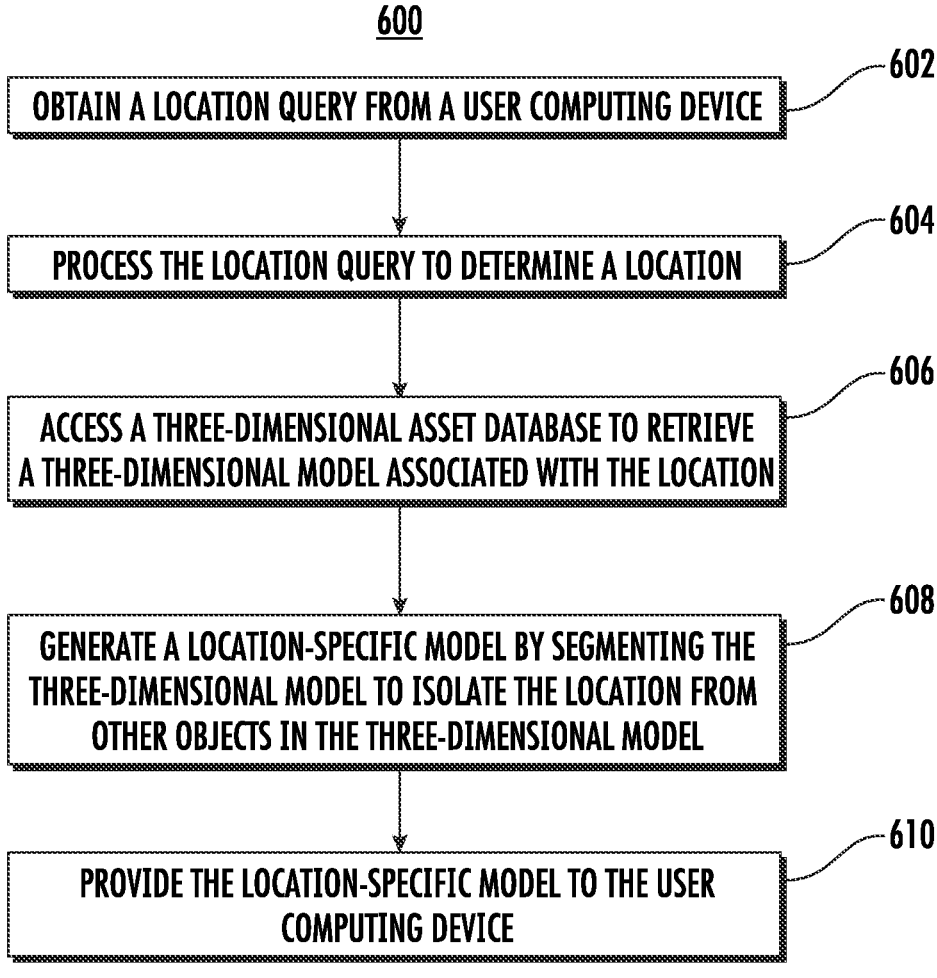

600

OBTAIN A LOCATION QUERY FROM A USER COMPUTING DEVICE — 602

PROCESS THE LOCATION QUERY TO DETERMINE A LOCATION — 604

ACCESS A THREE-DIMENSIONAL ASSET DATABASE TO RETRIEVE A THREE-DIMENSIONAL MODEL ASSOCIATED WITH THE LOCATION — 606

GENERATE A LOCATION-SPECIFIC MODEL BY SEGMENTING THE THREE-DIMENSIONAL MODEL TO ISOLATE THE LOCATION FROM OTHER OBJECTS IN THE THREE-DIMENSIONAL MODEL — 608

PROVIDE THE LOCATION-SPECIFIC MODEL TO THE USER COMPUTING DEVICE — 610

FIG. 6

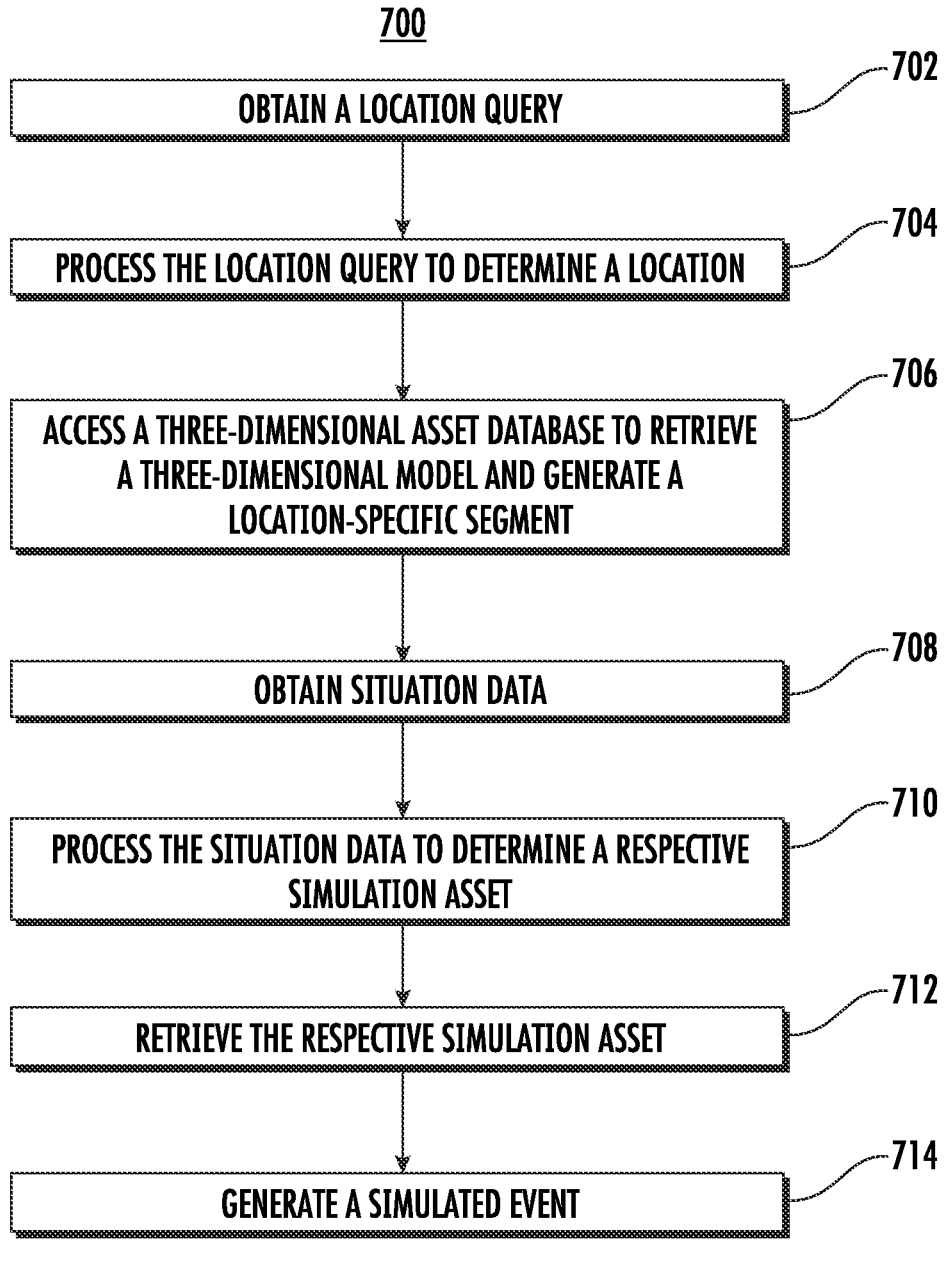

700

OBTAIN A LOCATION QUERY — 702

PROCESS THE LOCATION QUERY TO DETERMINE A LOCATION — 704

ACCESS A THREE-DIMENSIONAL ASSET DATABASE TO RETRIEVE A THREE-DIMENSIONAL MODEL AND GENERATE A LOCATION-SPECIFIC SEGMENT — 706

OBTAIN SITUATION DATA — 708

PROCESS THE SITUATION DATA TO DETERMINE A RESPECTIVE SIMULATION ASSET — 710

RETRIEVE THE RESPECTIVE SIMULATION ASSET — 712

GENERATE A SIMULATED EVENT — 714

LOCATION-SPECIFIC THREE-DIMENSIONAL MODELS RESPONSIVE TO LOCATION-RELATED QUERIES

PRIORITY CLAIM

The present application is based on and claims priority to U.S. Non-Provisional application Ser. No. 17/227,871 having a filing date of Apr. 12, 2021. Applicant claims priority to and the benefit of each of such applications and incorporates all such applications herein by reference in its entirety.

FIELD

The present disclosure relates generally to providing a three-dimensional model of a location in response to a user query for information that is relevant or related to a location. More particularly, the present disclosure relates to providing a location-specific segment of a three-dimensional model of a location in response to a location-related query for information associated with that location such as, for example, a search query, a navigational query, a mapping query, a weather query, a review query, a visual query, and/or other user requests for location-related information.

BACKGROUND

When searching for locations via a search engine, certain existing systems can return results in the form of hyperlinks and/or a generated graphic that can include a textual snippet, a photograph, or a map. For monuments and landmarks, these results often fail to depict the actual look and magnitude of the monument or landmark. Moreover, images can provide a perspective of what the location may look like, but images alone can fail to capture the dimensionality of the location. Furthermore, videos of locations can also be limited for a variety of reasons. In particular, the search results lack interactivity, which can make finding different aspects of the location difficult (e.g., context on the location or different perspective views of the location). For example, trying to find close-ups of different perspectives or looking at different portions of the location can require tedious searching instead of being provided in an intuitive, interactive interface.

Knowing the weather, traffic, and crowd size at monuments and landmarks can help tourists and other visitors better understand and prepare for a visit to the monument. Maps alone fail to put traffic or crowd size into perspective. Moreover, monument or landmark visibility can be affected by crowd size or weather. Knowledge about the effect of these factors to visibility can often be limited to scouring literature on the subject. However, many people consider themselves visual learners.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for supplying three-dimensional modeling to a user. The method can include obtaining, by a computing system that can include one or more computing devices, a location query associated with a user computing device. The method can include processing, by the computing system, the location query to determine a location. In some implementations, the method can include accessing, by the computing system, a three-dimensional asset database to retrieve a three-dimensional model that models the location in combination with one or more other, different locations. The method can include segmenting, by the computing system, the three-dimensional model to generate a location-specific segment of the three-dimensional model that corresponds to the location. In some implementations, the location-specific segment can model the location in isolation from the one or more other, different locations. The method can include providing, by the computing system, the location-specific segment of the three-dimensional model or one or more renderings of the location-specific segment of the three-dimensional model to the user computing device.

Another example aspect of the present disclosure is directed to a computing system. The computing system can include one or more processors and one or more non-transitory computer readable media that collectively store instructions that, when executed by the one or more processors, cause the computing system to perform operations. The operations can include obtaining a location query from a user computing device. The operations can include processing the location query to determine a location. In some implementations, the operations can include accessing a three-dimensional asset database to retrieve a three-dimensional model associated with the location. The operations can include generating a location-specific model by segmenting the three-dimensional model to isolate the location from other objects in the three-dimensional model and providing the location-specific model to the user computing device.

Another example aspect of the present disclosure is directed to one or more non-transitory computer readable media that collectively store instructions that, when executed by one or more processors, cause a computing system to perform operations. The operations can include obtaining a user input that specifies a location query that relates to a location. The operations can include providing the location query to a server system over a network. In some implementations, the operations can include receiving, from the server system over the network, a location-specific segment of a three-dimensional model or one or more renderings of the location-specific segment of a three-dimensional model. The three-dimensional model can model the location in combination with one or more other, different locations, and the location-specific segment of a three-dimensional model can be generated by segmenting the three-dimensional model to isolate the location from the one or more other, different locations. The operations can include providing for display at least a first rendering of the location-specific segment of the three-dimensional model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6 depicts a flow chart diagram of an example method to perform location-based model search according to example embodiments of the present disclosure.

FIG. 7 depicts a flow chart diagram of an example method to perform location-based model search according to example embodiments of the present disclosure.

Figure 1:
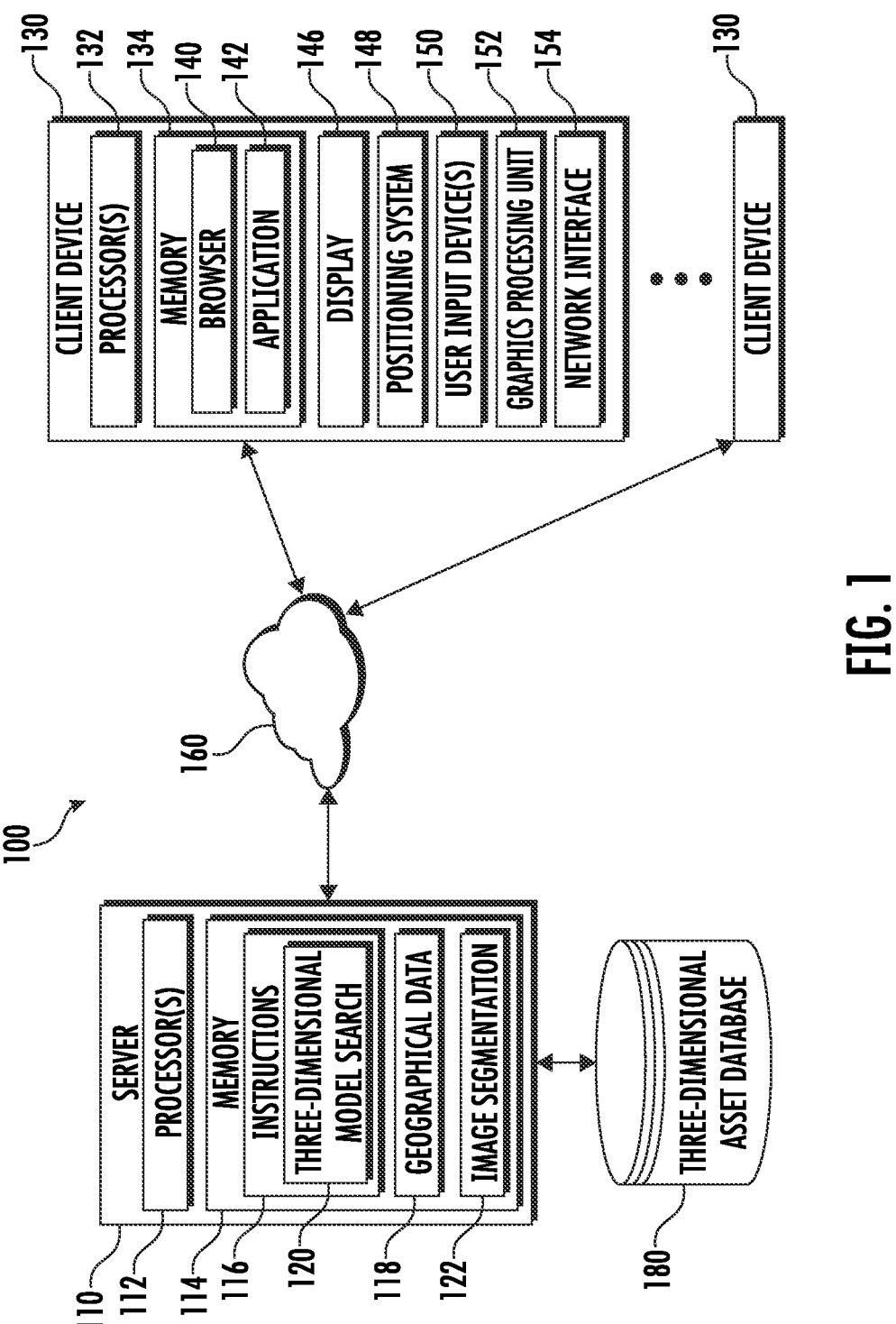
FIG. 1 depicts a block diagram of an example computing system that performs a location-based model search according to example embodiments of the present disclosure.

Reference numerals that are repeated across plural figures are intended to identify the same features in various implementations.

DETAILED DESCRIPTION

Overview

Generally, the present disclosure is directed to providing a location-specific segment of a three-dimensional model of a location in response to a location-related query for information associated with that location such as, for example, a search query, a navigational query, a mapping query, a weather query, a review query, a visual query, and/or other user requests for information. The systems and methods disclosed herein can leverage a database of three-dimensional models for providing location-based renderings and/or location-specific models in response to a location-related query (a "location query"). In some implementations, the systems and methods can include obtaining a location query. The location query can be obtained from a user computing device or may be triggered by a user computing device. The systems and methods can include processing the location query to determine a location. In some implementations, the systems and methods can include accessing a three-dimensional asset database to retrieve a three-dimensional model associated with the location. The three-dimensional model and the location can be used to generate a location-specific model. Generating the location-specific model can involve segmenting the three-dimensional model to isolate the location from other objects in the three-dimensional model. The systems and methods can include providing the location-specific model to a computing system. For example, the location-specific model may be provided to the user computing device. In some implementations, the location-specific model can include an architectural structure (e.g., a landmark, a monument, and/or a building).

Obtaining the location query can be facilitated by a user interface that is configured to receive input from a user. Alternatively and/or additionally, the location query may be a query generated by and obtained by the computing system in response to a user computing device triggered event. For example, a user may be scrolling through a list of attractions and selects a particular attraction to learn more about the attraction. In response to the selection, a location query for the attraction may be generated and obtained for processing. In other examples, a user can request to view the location on a map, request navigational instructions to the location, request information (e.g., user-generated reviews) about a point of interest associated with the location, submit a textual or visual search query for which the location is a result, and/or other actions which indicate a request for information related to the location. Each of these example actions can trigger a location query for processing by the proposed systems.

In some implementations, the location query can include a string of terms or one or more images that are associated with a particular location. The terms may describe the location, may include the name of the location, may be the address of the location, or may be any other form of indirect or directly related information that implicates the location or for which the location is a relevant result. In some examples, the location query may include images for processing and determining where the picture was taken or what is depicted in the image.

Once a location is determined, a three-dimensional asset database may be accessed and searched to determine if the particular location has any associated three-dimensional models. The three-dimensional model can be a constructed three-dimensional model of a particular structure or a plurality of structures that are found at that location. In particular, in some implementations, the three-dimensional asset database can contain a general or global three-dimensional model that spans a significant portion of the surface of the Earth or of individual countries or cities located therein. For example, various algorithms can be applied to automatically generate from available imagery (e.g., satellite imagery and/or street-level imagery) one or more very large three-dimensional models that span various addresses, streets, neighborhoods, cities, and/or the like.

To provide a location-specific model, the systems and methods can isolate a location in the general three-dimensional model to generate a location-specific model. Specifically, example systems of the present disclosure can segment portions of the general three-dimensional model into multiple segments. In some implementations, the systems and methods can perform three-dimensional segmentation to extract a location-specific segment of the three-dimensional model that models one or more specific locations. The location-specific model may be generated using image segmentation.

After the location-specific segment of the model is generated, the location-specific segment of the three-dimensional model can be rendered and displayed to the user in various contexts. As one example, a server computing system can transmit or serve the location-specific segment of the three-dimensional model to the user computing device, and the user computing device can render a rendering of the location using the location-specific model. Alternatively and/or additionally, the server computing system can perform rendering of the location-specific segment of the three-dimensional model and can transmit or serve the rendering to the user computing device.

In some implementations, the location-specific segment of the three-dimensional model can be generated by image segmentation using a plurality of images associated with the location. Moreover, the plurality of images can include one or more aerial images. Alternatively and/or additionally, in some implementations, the model may be generated using Light Detection and Ranging (LiDAR) data or other sensor data (e.g., spectrum sensor data generated using spectrum sensors, which can be used to segment trees or other objects). In particular, the LiDAR data or other sensor data can be used to determine what should be segmented.

The location-specific segment of the three-dimensional model may be provided in various methods via various mediums. In some implementations, the location-specific model can be provided as an augmented-reality asset for rendering in a user's environment via an augmented-reality experience. Alternatively and/or additionally, the location-specific model can be provided in a virtual-reality experience. In some implementations, the user computing device can be provided with an interactive virtual environment that can include the location-specific model. Moreover, the interactive environment can include one or more two- or three-dimensional maps. The location-specific segment of the three-dimensional model can be provided in a pre-rendered video or a set of pre-rendered videos, in which each video may depict different views of the location generated based on the location-specific segment.

In some implementations, the location-specific model may be provided with other information or data related to or associated with a location. For example, the systems and methods can include retrieving an address of the location and providing the address of the location with the location-specific model. In some implementations, the systems and methods can include retrieving location information data. The location information data can include information pertaining to the location (e.g., information on the history of the location). The location information data can be provided with the location-specific model to the user computing device. In some implementations, the location-specific model may be provided with a plurality of images of the location. Moreover, in some implementations, the systems and methods can include generating a map that includes the location-specific model and providing the map to the user computing device. Additionally, in some implementations, the systems and methods can include obtaining location data for the user computing device. The location data can be descriptive of a user location. The systems and methods can include obtaining an address for the location associated with the location-specific model. The address and the user location can be used to determine a route for a user to take to get from the user location to the address. A visual route overlay may be generated based on the route, and the visual route overlay and the map may be used to generate an augmented map with the visual route overlay being superimposed on the map. The augmented map can then be provided to a user computing device.

Alternatively and/or additionally, the systems and methods can include obtaining situation data. The situation data can be descriptive of a time-specific situation associated with the location. The systems and methods can include processing the situation data to determine a respective simulation asset and retrieving the respective simulation asset. The respective simulation asset and the location-specific model may be used to generate a simulated event that includes the time specific situation occurring at the location. In some implementations, the situation may be a weather condition, locations of various physical items such as trains, airplanes, buses, taxis, and/or the like, a crowd size, and/or traffic at or around the location. For example, the time-specific situation may be rain, and the generated simulated event may be a rendering of the location-specific segment of the three-dimensional model with simulated rain.

In some implementations, the providing of the location-specific model may include providing the location-specific model with one or more search results via a webpage (e.g., a webpage returned in response to a textual or visual location query). Alternatively and/or additionally, the location-specific model may be provided and displayed in a separate section or location on the webpage than the other search results. For example, in some implementations, the location-specific model may be provided in a separate pane with other data on the location associated with the model (e.g., the name of the location associated with the location-specific model, address of the location, and/or information on the location). In some implementations, the mesh segmentation can allow the responses to queries to be compact. Specifically, a segment of a mesh can be rendered (e.g., in a pane) more quickly than a rendering of the whole region. The segmentation rendering can therefore aid in providing search results without having the heavy taxation on bandwidth that full model rendering can cause.

The systems and methods disclosed herein can be utilized in a variety of fields and industries. For example, the systems and methods disclosed herein can be utilized to provide an enhanced user experience for a map application. More specifically, the systems and methods disclosed herein can be used to provide a map to a user with a location-specific model in response to a location query. The map application may provide a visual route overlay to provide a realistic rendering of the area attempting to be navigated through. In some implementations, the map application can provide several options for understanding an area. The map application can provide a street view of the location, an overhead map, an aerial view map, or an interactive three-dimensional model.

Another example can include implementing the systems and methods into video games and/or augmented or virtual reality experiences. For example, the systems and methods disclosed herein can allow for the generation of an open world game in which a user can travel to different areas and upon reaching an area, a location query may be sent, and a location-specific model of the area may be received in response. More specifically, the game can be set in France, and when a character travels to a location, a location query for that location can be sent to a server and a location-specific model of the location may be received in return (e.g., the character may travel to the Eiffel Tower, a location query for the Eiffel Tower may be sent, and a location-specific model of the Eiffel Tower may be received in return).

The three-dimensional asset database leveraged by the systems and methods disclosed herein may be generated with a variety of methods or processes. The processes can begin with the creation of the three-dimensional content. The three-dimensional environment can be built through general three-dimensional reconstruction methods. The reconstruction can generate three-dimensional meshes with attached textures (e.g., two-dimensional images that represent the color of the mesh). The next step of the process can involve image segmentation. Segmentation can be used to understand the meshes and textures to find the underlying semantic structures of the environment (e.g., the semantic structure of a reconstructed city). In some implementations, the process can utilize semantic manifolds for image segmentation. The image segmentation can involve segmenting a plurality of two-dimensional images into parts with a machine-learned model. The segmented images can then be projected into the three-dimensional meshes. The process can further involve cleaning up the generated three-dimensional environment by removing blobs and cleaning up the mesh. For example, trees, streets, sidewalks, and other objects may be removed. The cleaning up step can be completed manually or can be automated. The resulting three-dimensional asset can be compressed and can be stored in a database. The process can be repeated iteratively to update the database with up to date structures from a city, town, etc.

The systems and methods of the present disclosure provide a number of technical effects and benefits. As one example, the system and methods can provide a location-specific segment of a three-dimensional model in response to a location query. The systems and methods can further be used to provide a model of the location (e.g., a landmark or monument) with real-time traffic, crowd size, weather, and/or other contextual or situation-specific information. Furthermore, the systems and methods can enable three-dimensional models for map applications.

Another technical benefit of the systems and methods of the present disclosure is the dimensionally accurate modeling and the interactivity of the provided rendering. The model can provide dimensionally accurate representations of locations to allow for potential visitors to determine if they indeed wish to visit the location.

Another example technical effect and benefit relates to improved computational efficiency and improvements in the functioning of a computing system. For example, certain existing systems allow a user to view renderings of a global or general three-dimensional model. Processing and rendering the entire global or general three-dimensional model requires significant computational resources. In contrast, by extracting and then rendering a location-specific segment of the three-dimensional model, the proposed systems and methods can save computational resources such as processor usage, memory usage, and/or network bandwidth.

With reference now to the Figures, example embodiments of the present disclosure will be discussed in further detail.

Example Devices and Systems

FIG. 1 depicts an exemplary computing system 100 that can be used to implement a location-based model search according to aspects of the present disclosure. The system 100 has a client-server architecture that includes a server 110 that communicates with one or more client devices 130 over a network 160. However, the present disclosure can be implemented using other suitable architectures, such as a single computing device unconnected to a network.

The system 100 includes a server 110, such as, for example, a web server. The server 110 can be one or more computing devices that are implemented as a parallel or distributed computing system. In particular, multiple computing devices can act together as a single server 110. The server 110 can have one or more processor(s) 112 and a memory 114. The server 110 can also include a network interface used to communicate with one or more remote computing devices (e.g., client devices) 130 over a network 160.

The processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by processor(s) 112, including instructions 116 that can be executed by processor(s) 112. The instructions 116 can be any set of instructions that when executed by the processor(s) 112, cause the processor(s) 112 to provide desired functionality.

In particular, the instructions 116 can be executed by the processor(s) 112 to implement a three-dimensional model search 120. The three-dimensional model search 120 can be configured to search for a three-dimensional model associated with a location to segment and output a location-specific three-dimensional model. In some implementations, the three-dimensional model search 120 can be configured to access a three-dimensional asset database 180 to retrieve the three-dimensional model, and the three-dimensional model can be segmented using the image segmentation element 122 stored in the memory 114 of the server computing system 110.

It will be appreciated that the term "element" can refer to computer logic utilized to provide desired functionality. Thus, any element, function, and/or instructions can be implemented in hardware, application specific circuits, firmware and/or software controlling a general purpose processor. In one implementation, the elements or functions are program code files stored on the storage device, loaded into memory and executed by a processor or can be provided from computer program products, for example computer executable instructions, that are stored in a tangible computer-readable storage medium such as RAM, hard disk or optical or magnetic media.

Memory 114 can also include geographic data 118 that can be retrieved, manipulated, created, or stored by processor(s) 112. Geographic data 118 can include geographic imagery (e.g., digital maps, satellite images, aerial photographs, street-level photographs, synthetic models, etc.), tables, vector data (e.g., vector representations of roads, parcels, buildings, etc.), point of interest data (e.g., locales such as islands, cities, restaurants, hospitals, parks, hotels, and schools), or other suitable geospatial data or related information. As an example, geographic data 118 can be used to access information and data associated with a location and generate a rendering of a three-dimensional model of the surface of the Earth.

The geographic data 118 can be stored in one or more databases. The one or more databases can be connected to the server 110 by a high bandwidth LAN or WAN, or can also be connected to server 110 through network 160. The one or more databases can be split up so that they are located in multiple locales.

The server 110 can exchange data with one or more client devices 130 over the network 160. Although two clients 130 are illustrated in FIG. 1, any number of client devices 130 can be connected to the server 110 over the network 160. The client devices 130 can be any suitable type of computing device, such as a general purpose computer, special purpose computer, navigational device, laptop, desktop, integrated circuit, mobile device, smartphone, tablet, wearable-computing devices, a display with one or more processors coupled thereto and/or embedded therein, or other suitable computing device. Further, client device 130 can be multiple computing devices acting together to perform operations or computing actions.

Similar to server 110, a client device 130 can include a processor(s) 132 and a memory 134. The memory 134 can store information accessible by processor(s) 132, including instructions that can be executed by processor(s) and data. As an example, memory 134 can store a browser element 140 and an application element 142.

Browser element 140 can provide instructions for implementing a browser. In particular, the user of client device 130 can exchange data with server 110 by using the browser to visit a website accessible at a particular web-address. The three-dimensional model search of the present disclosure can be provided as an element of a user interface of the website.

Application element 142 can provide instructions for running a specialized application on client device 130. In particular, the specialized application can be used to exchange data with server 110 over the network 160. Application element 142 can include client-device-readable code for providing and implementing aspects of the present disclosure. For example, application element 142 can provide instructions for implementing a mapping application or a virtual globe application.

The client device 130 can include various user input devices 150 for receiving information from a user, such as a touch screen, touch pad, data entry keys, speakers, mouse, motion sensor, and/or a microphone suitable for voice recognition. Further, the client device 130 can have a display 146 for presenting information, such as a rendering of a three-dimensional model in a three-dimensional environment.

The client device 130 can also include a positioning system 148 that can be used to identify the position of the client device 130. The positioning system 148 can be optionally used by the user to monitor the user's position relative to the rendering. The positioning system 148 can be any device or circuitry for monitoring the position of the client device 130. For example, the positioning device 148 can determine actual or relative position by using a satellite navigation positioning system (e.g., a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

The client device 130 can further include a graphics processing unit 152. Graphics processing unit 152 can be used by processor 132 to render or depict three-dimensional imagery. In some embodiments, client device 130 performs any and all three-dimensional rendering required for providing the three-dimensional environment.

The client device 130 can include a network interface 154 for communicating with server 110 over network 160. Network interface 154 can include any components or configuration suitable for communication with server 110 over network 160, including, for example, one or more ports, transmitters, wireless cards, controllers, physical layer components, or other items for communication according to any currently known or future developed communications protocol or technology.

The network 160 can be any type of communications network, such as a local area network (e.g., intranet), wide area network (e.g., Internet), or some combination thereof. The network 160 can also include a direct connection between a client device 130 and the server 110. In general, communication between the server 110 and a client device 130 can be carried via network interface using any type of wired and/or wireless connection, using a variety of communication protocols (e.g., TCP/IP, HTTP), encodings or formats (e.g., HTML, XML), and/or protection schemes (e.g., VPN, secure HTTP, SSL).

Example Model Arrangements

Figure 2:
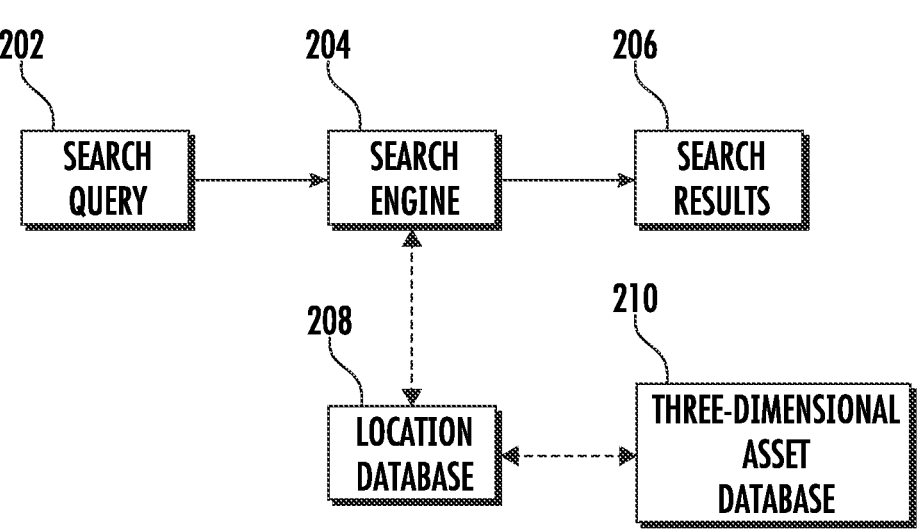
FIG. 2 depicts a block diagram of an example model search system according to example embodiments of the present disclosure.

FIG. 2 depicts a block diagram of an example model search system 200 according to example embodiments of the present disclosure. In some implementations, the model search system 200 is trained to receive a set of input data 202 descriptive of a search query and, as a result of receipt of the input data 202, provide output data 206 that includes one or more search results. Thus, in some implementations, the model search system 200 can include a search engine 204 that is operable to process a search query and determine intent.

The example model search system 200 can involve a search engine 204 obtaining a search query 202 as input and outputting search results 206 which can include one or more location-specific models. The search query 202 can be a location search query associated with a location. The search engine 204 can process the query to determine the location associated with the search query 202. The search engine can then access a location database 208 to retrieve data related to the location and may access a three-dimensional asset database 210 to determine if the location has a related three-dimensional model. If a three-dimensional model is found, the three-dimensional model may be segmented to generate a location-specific model, which can be output as a search result 206. In some implementations, the search results 206 can further include one or more links based on the search query 202 and may include location data retrieved from a location database 208.

Figure 3:
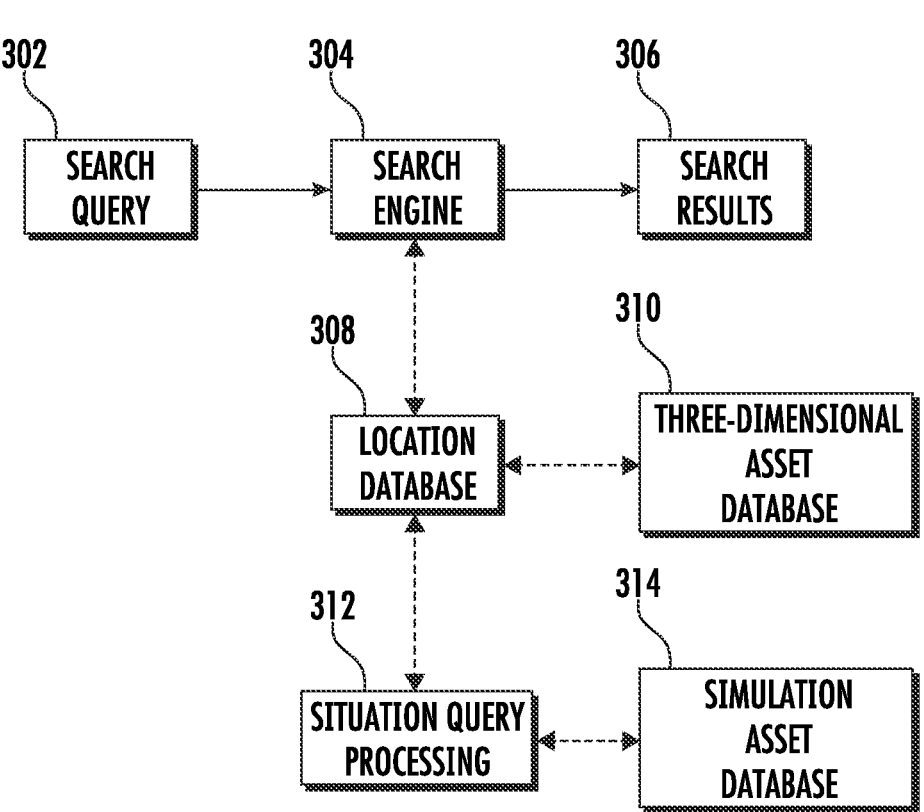
FIG. 3 depicts a block diagram of an example situation-aware model search system according to example embodiments of the present disclosure.

FIG. 3 depicts a block diagram of an example situation-aware model search system 300 according to example embodiments of the present disclosure. The situation-aware model search system 300 is similar to the model search system 200 of FIG. 2 except that situation-aware model search system 300 further includes situation aware search and rendering.

The example situation-aware model search system 300 can involve a search engine 304 obtaining a search query 302 as input and outputting search results 306 which can include one or more location-specific models. The search query 302 can be a location search query associated with a location. The search engine 304 can process the query to determine the location associated with the search query 302. The search engine can then access a location database 308 to retrieve data related to the location and may access a three-dimensional asset database 310 to determine if the location has a related three-dimensional model. If a three-dimensional model is found, the three-dimensional model may be segmented to isolate the location to generate a location-specific model, which can be output as a search result 306. In some implementations, the search results 306 can further include one or more links based on the search query 302 and may include location data retrieved from a location database 308. In some implementations, the search engine can further access time specific situation data related to the location using situation query processing 312, which can be used to determine the time specific situation. Once a time specific situation is determined, a simulation asset database 314 can be accessed to retrieve a simulation rendering effect descriptive of the determined situation. The location-specific model and the simulation rendering effect can be used to generate a simulated event to be output as a search result. The simulated event can include a three-dimensional model of a location with the situation rendered into the model. For example, the search query may be related to the Washington Monument, and the time specific situation may include the current weather state, which includes rain. Therefore, the simulated event can be a model of the Washington Monument with rain rendered into the model.

Figure 4:
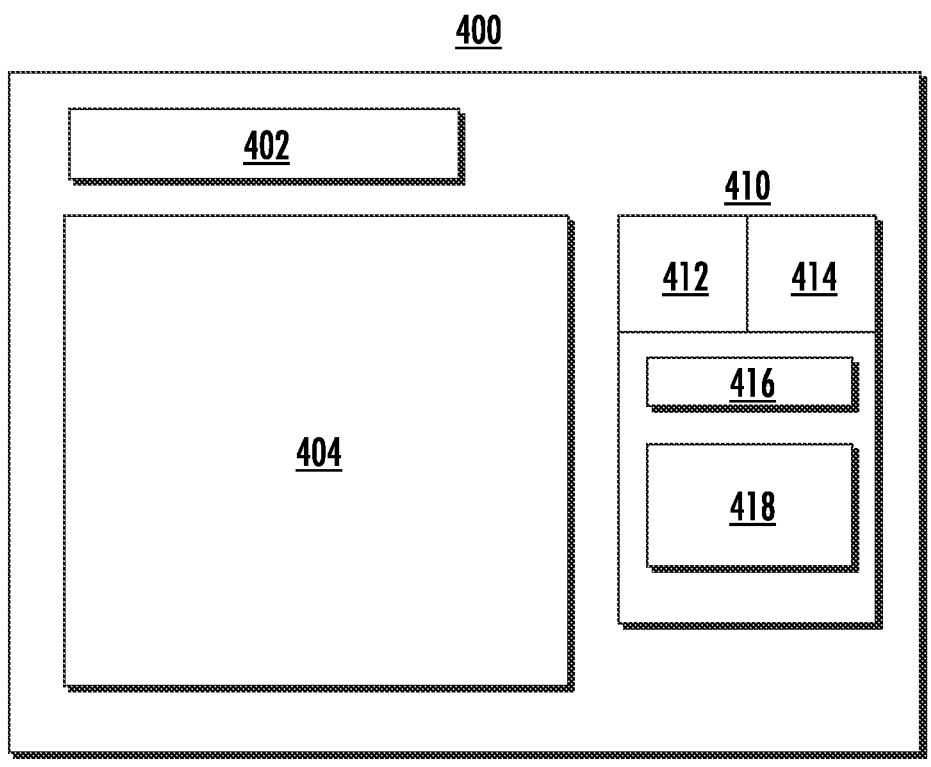
FIG. 4 depicts a block diagram of an example three-dimensional rendering according to example embodiments of the present disclosure.

FIG. 4 depicts a block diagram of an example results page 400 according to example embodiments of the present disclosure. In some implementations, the results page 400 can include a search query input bar 402 and, as a result of inputting a search query into the search query input bar 402, provide one or more search results 404 that can include links, text, and/or media in response to the search query input. In some implementations, the results page 400 can include a knowledge graph 410 that is operable to provide a group of data related to one or more search results.

The example results page 400 of FIG. 4 can be output in response to a search query. The search query can be a location search query and can be a search query input into a web search service. The search results page 400 can include a search query input bar 402 for inputting new queries or refining the current query. In some implementations, the search query input bar 402 can continue to display the last search query input or can be emptied upon retrieving the search results. Moreover, the search results page 400 can further include one or more search results 404. The search results 404 can include links, images, snippets, maps, videos, and/or documents related to a determined search intent. The search results page 400 can include a knowledge graph 410, which can include one or more media items 412, a location-specific model 414, a location name 416, and location information 418. The knowledge graph 410 can be generated based on a predefined function, one or more machine-learned models, and/or a pre-defined knowledge graph associated with the location. The one or more media items 412 can be images, videos, graphs, maps, or audio data related to the location. Moreover, the location-specific model 414 may be generated by retrieving and segmenting a three-dimensional model in response to retrieving the search query. The location name 416 may be a formal name or a translated name of the location determined from the search query. Lastly, the location information 418 can include a variety of information on population, history, architecture, or size of the location. The location information 418 can be extracted from one or more search results or can be data paired with the location name in a location database.

Figure 5:
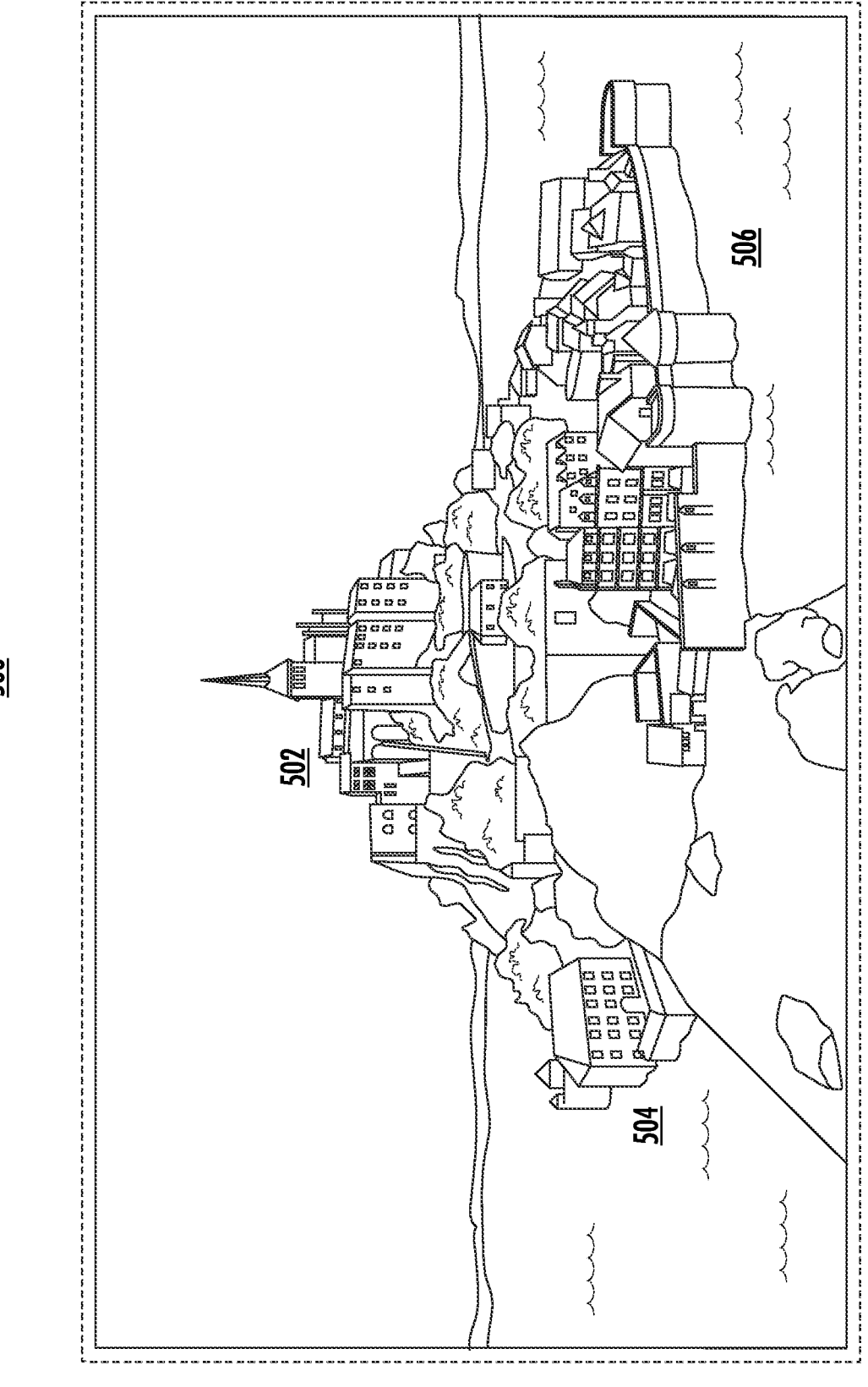
FIG. 5 depicts an illustration of an example search results page according to example embodiments of the present disclosure.

FIG. 5 depicts an illustration of an example three-dimensional rendering 500 according to example embodiments of the present disclosure. In some implementations, the three-dimensional rendering 500 can provide different perspective views, that can include an aerial view.

The example three-dimensional rendering 500 of FIG. 5 displays one perspective of a location. The rendering 500 can be displayed in response to a search query and may be rendered based on a provided location-specific model. The location-specific model can be provided in an interactive environment to provide a user with the ability to navigate the location-specific model to view different respective perspectives of the location, including an aerial view 502 or various side views 504 and 506. The rendering of the different perspectives can be based on the location-specific model and may occur at either the server computing system or the client computing system. Alternatively and/or additionally, the location specific-model can be provided as part of a pre-rendered media clip in which the three-dimensional rendering 500 and the different perspective views 502, 504, and 506 can be part of a video, slide show, or other display medium. In some implementations, the location-specific model may be provided as part of a virtual-reality experience, such that the three-dimensional rendering 500 can be one of a plurality of renderings viewed by a user while navigating the virtual space. Generation of the location-specific three-dimensional model can utilize geometry extraction and may use Unreal Engine to display the model.

Figure 9A:
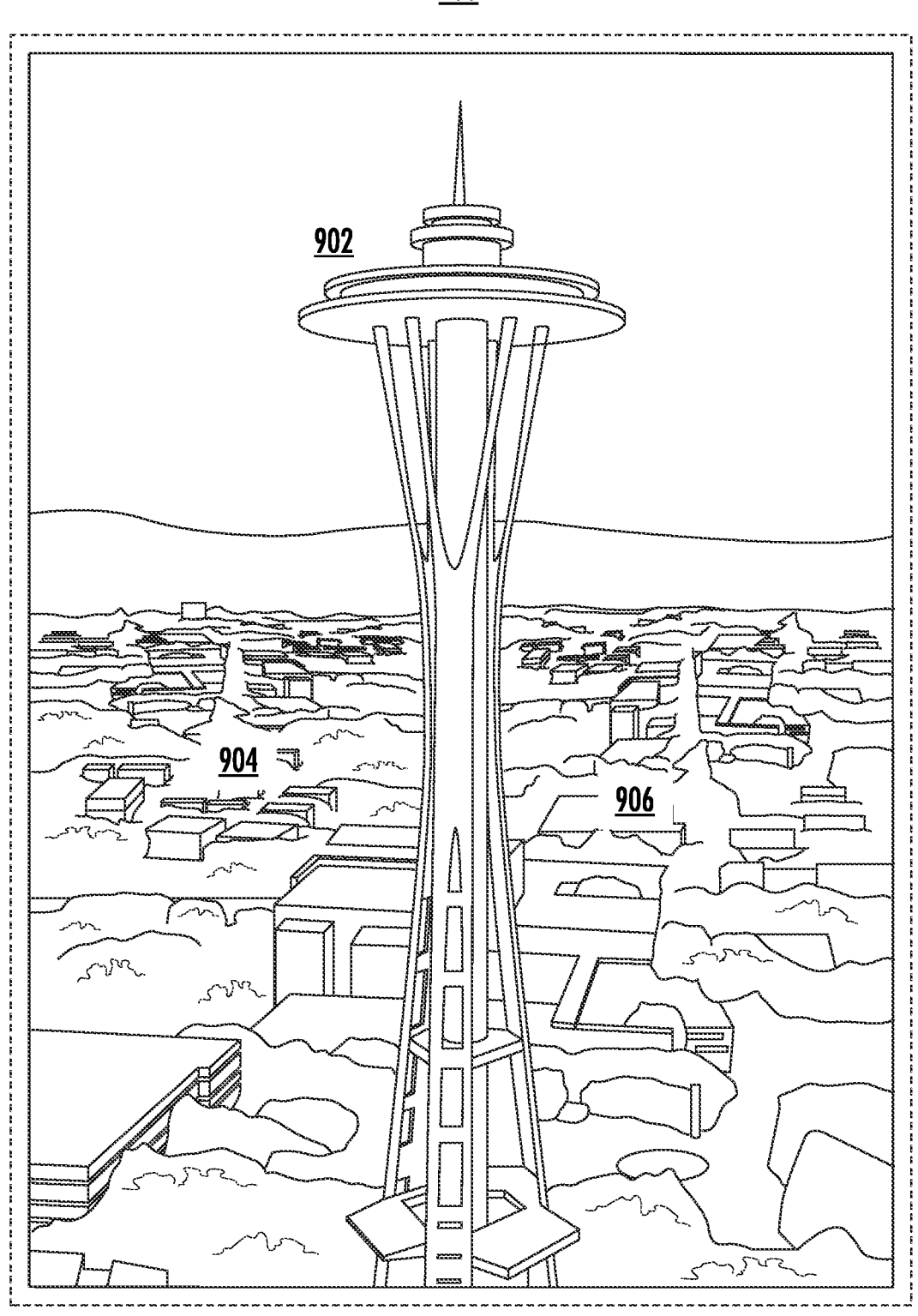
FIG. 9A depicts an illustration of an example three-dimensional model according to example embodiments of the present disclosure.

FIG. 9A depicts an illustration of an example three-dimensional rendering 900 according to example embodiments of the present disclosure.

A three-dimensional rendering 900 can be based on a three-dimensional model and may be a rendering of any perspective, which can include one or more aerial perspectives. The three-dimensional rendering 900 of FIG. 9 is based on a location-specific model related to the Space Needle in Seattle. The rendering 900 includes one perspective, but alternative renderings can be generated based on the location-specific model, including but not limited to an aerial view 902 or a plurality of side views 904 and 906. In some implementations, the rendering 900 can include situation specific renderings to provide situation specific simulations. For example, this specific rendering 900 displays the Space Needle during an overcast day. However, Seattle is not always precipitation free and alternatively is not always overcast. A user may want a simulation of what the Space Needle looks like during various weather states. In some implementations, the location-specific model can be provided to a user computing device without outside features or objects. The location-specific model could then be viewed completely isolated or outside environmental features may be added by the user computing device based on user input.

Figure 9B:
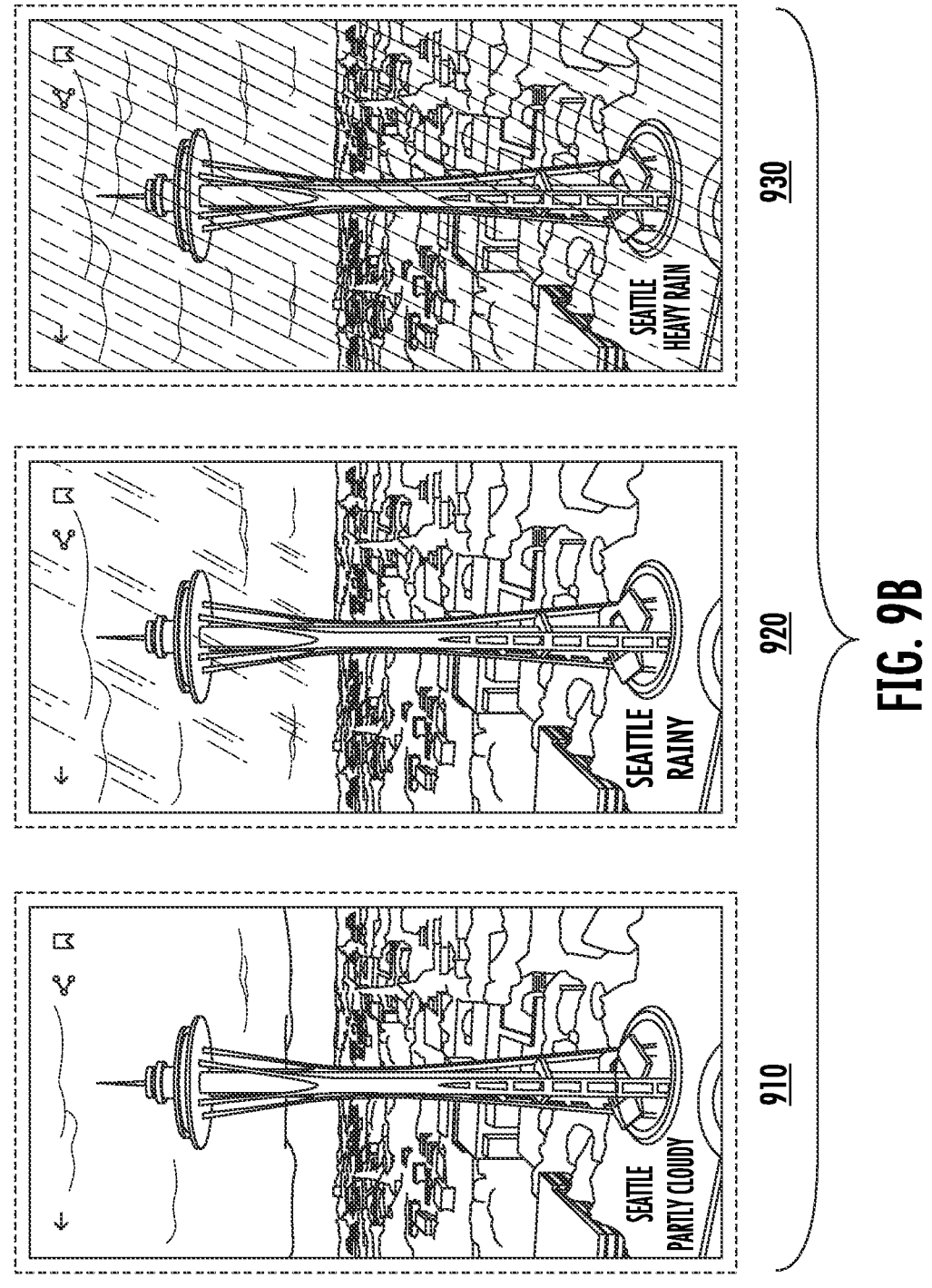
FIG. 9B depicts an illustration of an example situation-aware three-dimensional model according to example embodiments of the present disclosure.

FIG. 9B depicts illustrations of example three-dimensional renderings 910, 920, and 930 according to example embodiments of the present disclosure. The three-dimensional renderings 910, 920, and 930 are similar to the three-dimensional rendering 900 of FIG. 9A except that the three-dimensional renderings 910, 920, and 930 further include situation based simulations.

The systems and methods disclosed herein can be used to retrieve or generate situation data, which can be used to retrieve simulation assets related to the situation described by the situation data. The simulation assets can be used to generate a simulated event with the location-specific model, which can include a simulation of the specific situation. For example, FIG. 9B displays three simulated weather states generated using the location-specific model and a simulation asset. The three-dimensional renderings are displayed in a user-interface with a location and the weather state. A partly cloudy three-dimensional rendering 910 can provide a simulated partly cloudy weather state for the location, which can provide a user with a rendering that accurately depicts that location with that particular weather state. Moreover, the systems and methods disclosed herein can provide previews of the location in various other weather states such as a rainy weather state 920 or a heavy rain weather state 930. These renderings can be time specific to an input time by a user, can be based on a real-time situational state, or can be a manually selected situational state. Alternatively and/or additionally, the situation can be a crowd situation, a traffic situation, and/or a variety of other situations that may be determined and simulated for the user.

Figure 10:
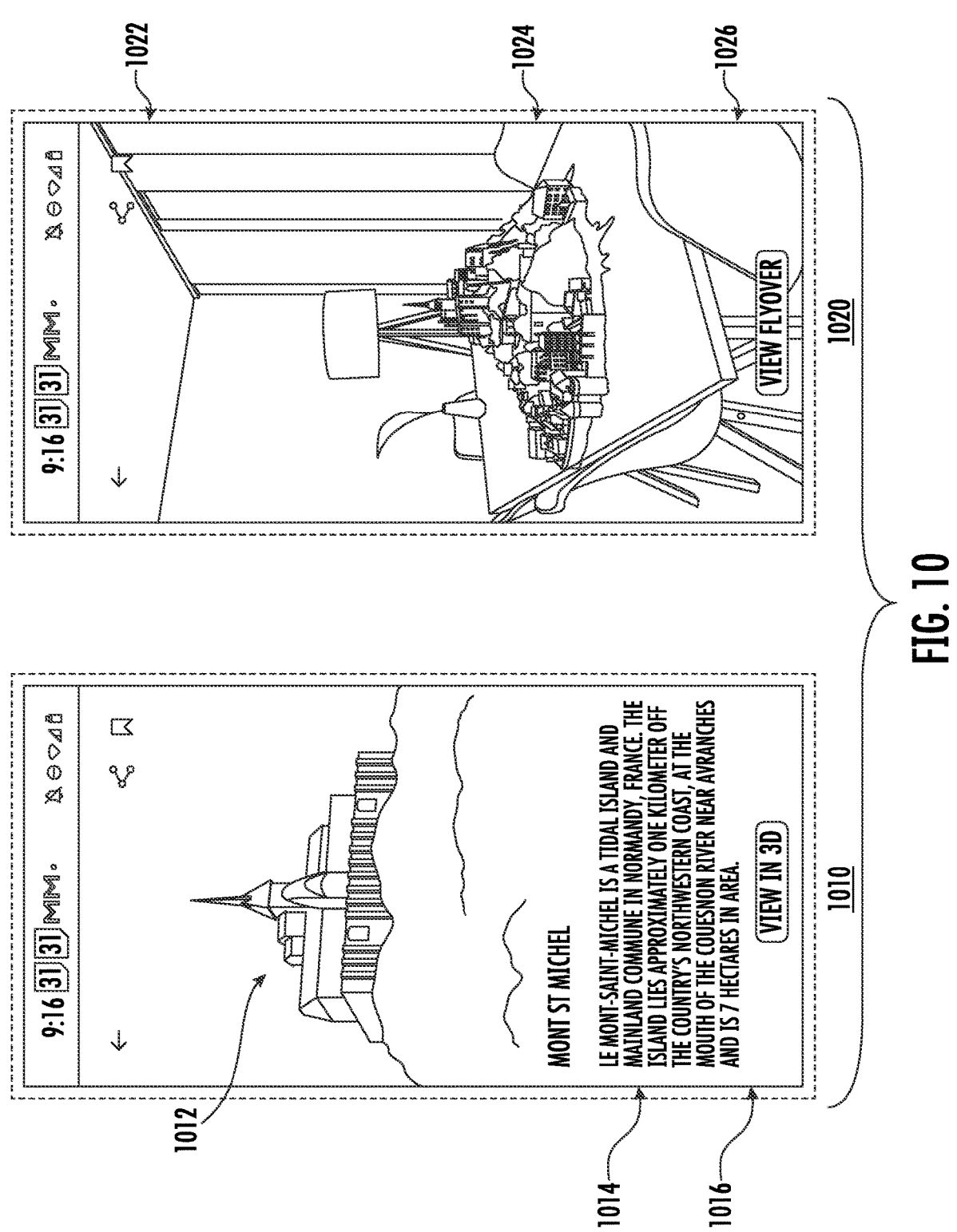
FIG. 10 depicts an illustration of an example augmented-reality experience according to example embodiments of the present disclosure.

FIG. 10 depicts an illustration of an example augmented-reality experience 1020 according to example embodiments of the present disclosure. In some implementations, the augmented-reality experience 1020 is trained to receive a set of input data descriptive of a three-dimensional model and, as a result of receipt of the input data, provide output data 1024 that can be a rendering of a three-dimensional model of a location. Thus, in some implementations, the augmented-reality experience 1020 can include a preview of a location 1012 that is operable to depict the location before an augmented-reality experience is selected 1016.

The augmented-reality experience 1020 can be one of many mediums in which to provide the location-specific model. In this implementation, the user computing device is provided with a user interface that allows the user to view the location-specific model 1012 in context 1010 or as an augmented-reality rendering 1024. In this implementation, the user interface provides the location-specific model in context 1010 with the location name and a textual snippet 1014 with information on the location. The user interface can contain a selectable icon 1016 to switch to an augmented-reality experience 1020 that can use the location-specific model 1012 to render the location into a user's environment 1022. The augmented-reality rendering 1024 can be placed in the user's environment 1022 via the augmented-reality experience 1024 to view the location as a scaled down model. Moreover, the user interface can provide a selectable icon 1026 to exit the augmented-reality experience 1020 and return to the location-specific model 1012 in context 1010.

Figure 11:
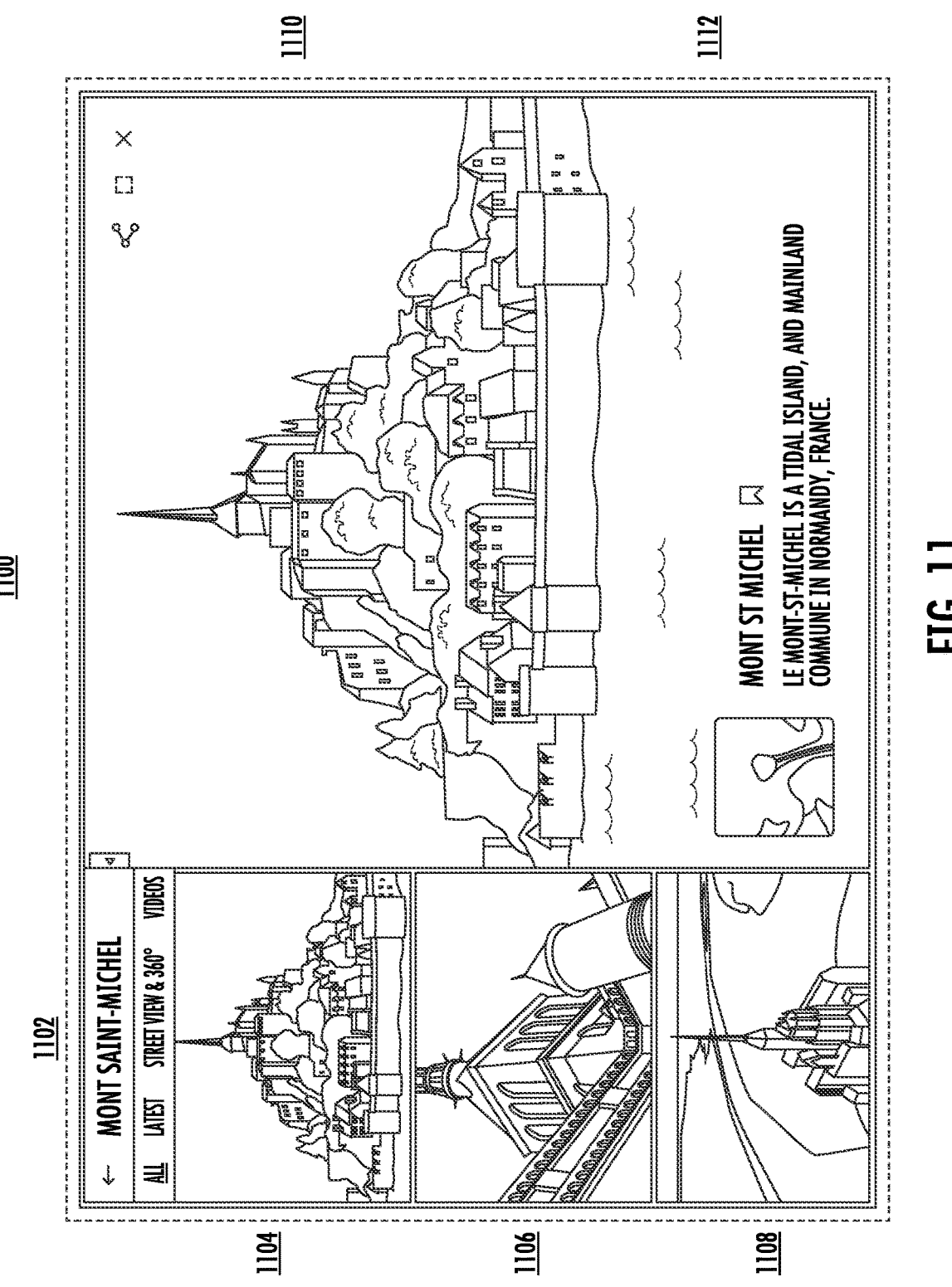
FIG. 11 depicts an illustration of an example rendering display according to example embodiments of the present disclosure.

FIG. 11 depicts an illustration of an example media results page 1100 according to example embodiments of the present disclosure. In some implementations, the media results page 1100 can include a set of images of a location 1104, 1106, and 1108, and a location-specific three-dimensional model 1110. Furthermore, in some implementations, the media results page 1100 can include an interactive environment that is operable to view and interact with the location-specific three-dimensional model 1110.

The media results page 1100 in FIG. 11 includes a plurality of image results 1104, 1106, and 1108, the search query 1102, a three-dimensional model of the location, a map of the location, and the name of the location 1112. In the depicted implementation, the search query 1102 includes the name of the location, but in other implementations, the search query can include an address, descriptors of the location, or any other query that can be associated with the location. The plurality of images 1104, 1106, and 1108 can be displayed as a side panel with selectable tabs at the top of the panel to refine the results or depict different forms of media. Moreover, the media results page 1100 can provide links to source data or other pages by selecting the media or various selectable icons.

The location-specific three-dimensional model 1110 can be provided in a main pane, a solo pane, or on the side pane. The location-specific model 1110 can be provided in an interactive environment or in a pre-rendered media form. In some implementations, the media results page 1100 can include location information or location-specific data superimposed over one or more of the media items. For example, in this implementation, a map of the location and its surrounding area, the location name 1112, and information on the location are superimposed over the three-dimensional model 1110.

Figure 12:
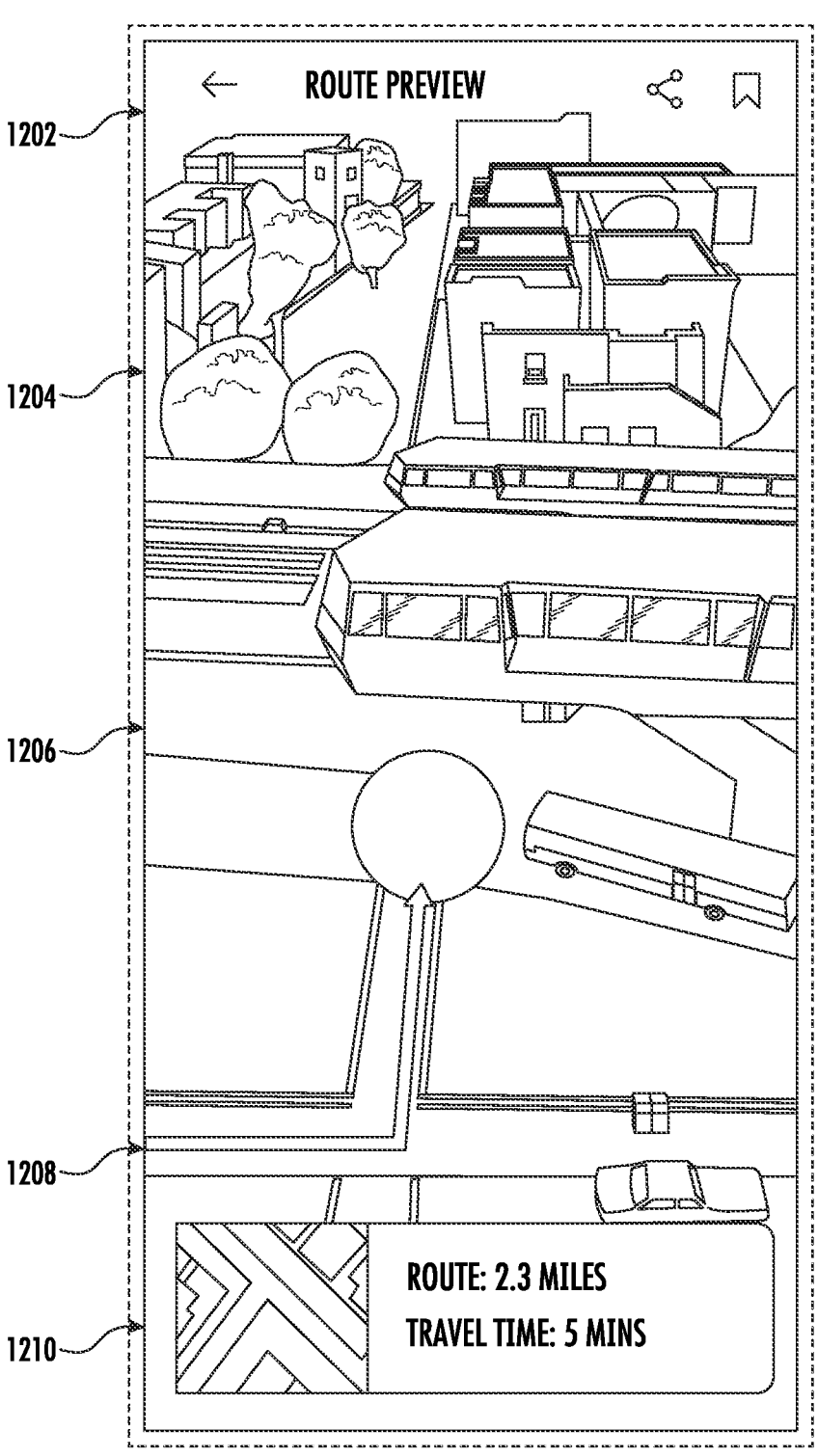
FIG. 12 depicts an illustration of an example route overlay according to example embodiments of the present disclosure.

FIG. 12 depicts an illustration of an example route overlay model 1200 according to example embodiments of the present disclosure. In some implementations, the route overlay model 1200 can include a location-specific model 1204 superimposed over a map and a visual route overlay 1208 descriptive of a suggested navigational route to reach a location.

A route overlay model 1200 can utilize the location-specific model 1204, a map database, and a determined navigational route to provide a user with an enhanced map application experience. The route overlay model can involve the generation of a location-specific model 1204, the retrieval of a user computing device location, the retrieval of a location address, and the retrieval of a map. The retrieved user location and the retrieved location address along with the retrieved map can be used to determine a route to get from the user location to the address. The determined route can be used to generate a visual route overlay 1208 descriptive of a navigational route. The map, the location-specific model 1204, and the visual route overlay 1208 can be used to generate an augmented map that depicts the location-specific model 1204 and the visual route overlay 1208 superimposed over the map to provide navigational directions to a user with the added visual nuances of the three-dimensional model.

In this example implementation, the route overlay model 1200 can be part of a map application that can further include various features such as route previews 1202, ordered directions list, location labels (e.g., transit location, restaurants, lodging, etc.), location markers (e.g., waypoint, final destination, etc.), etc. The depicted route overlay model 1200 includes the location-specific model (i.e., a transit station) superimposed on a map with a visual route overlay 1208 providing directions to the location marker 1206. The route overlay model can be provided via a user interface, which can include a two-dimensional map and directions 1210 along with the three-dimensional representation.

Example Methods

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain a location query from a user computing device. The location query can be a search query input into a user interface by a user.

At 604, the computing system can process the location query to determine a location.

At 606, the computing system can access a three-dimensional asset database to retrieve a three-dimensional model associated with the location. The three-dimensional model can include one or more architectural structures and may include the determined location.

At 608, the computing system can generate a location-specific model by segmenting the three-dimensional model to isolate the location from other objects in the three-dimensional model. The segmenting can be three-dimensional segmentation or image segmentation to remove trees, roads, and other buildings from the three-dimensional model to generate the location-specific model. The segmentation can involve utilizing a plurality of images of the location to segment the three-dimensional model, and the plurality of images may include one or more aerial images. In some implementations, the location-specific model can include a model of an architectural structure (e.g., landmark, monument, historical building, etc.).

At 610, the computing system can provide the location-specific model to the user computing device. The location-specific model can be provided as part of an interactive environment, a virtual-reality experience, an augmented-reality experience, and/or a pre-rendered media item. In some implementations, the location-specific model can be provided with location information, which can include a location name, a location address, location images, and/or location facts.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a location query. The location query may include one or more search terms and/or one or more images.

At 704, the computing system can process the location query to determine a location. The location can be determined using a search engine, location tags, and or other determination methods.

At 706, the computing system can access a three-dimensional asset database to retrieve a three-dimensional model and generate a location-specific segment. The three-dimensional asset database can leverage a large database of images to generate a plurality of three-dimensional models that can be associated with locations and made readily searchable. The generation of the location-specific segment can include removing objects from the three-dimensional model that are not part of the specific determined location. In some implementations, the location-specific segment can be generated by a segmentation process that isolates a location-specific model by removing portions of the three-dimensional model.

At 708, the computing system can obtain situation data. The situation data can be descriptive of a time specific situation associated with the determined location. The time specific situation can be a weather state, a traffic level, a crowd size, and/or train locations.

At 710, the computing system can process the situation data to determine a respective simulation asset. The respective simulation asset can be a set of data that can enable the rendering of the specific situation into a simulated event.

At 712, the computing system can retrieve the respective simulation asset. The simulation asset can be retrieved from a database of simulation assets that store a plurality of situation specific simulation assets.

At 714, the computing system can generate a simulation event. The simulation event can include the location and the time specific situation based on the location-specific segment and the respective simulation asset. For example, the location can be Golden Gate Bridge, and the time specific situation can be rain with heavy traffic. The location-specific segment can be a three-dimensional model of the Golden Gate Bridge, and the simulated event can be the Golden Gate Bridge model with heavy traffic and rain rendered into the model.

Figure 8:
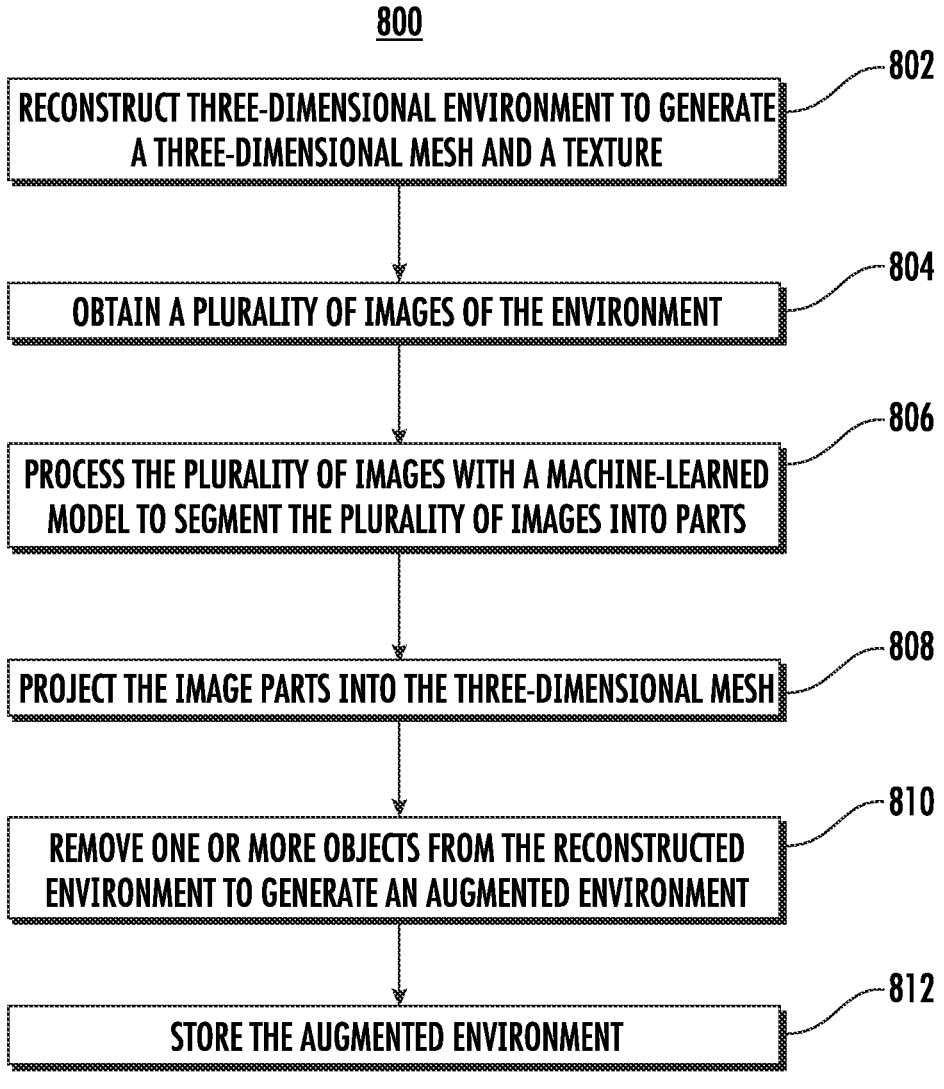
FIG. 8 depicts a flow chart diagram of an example method to perform three-dimensional model database creation according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can reconstruct a three-dimensional environment to generate a three-dimensional mesh and a texture. The reconstruction can include a database of collected map data, image data, and other location data.

At 804, the computing system can obtain a plurality of images of the environment.

At 806, the computing system can process the plurality of images with a machine-learned model to segment the plurality of images into parts. The segmentation can be used to understand the meshes and textures to find the underlying semantic structures of the environment. The segmentation can utilize semantic manifolds for the image segmentation. A graph cut algorithm can be applied to truly segment the mesh into parts.

At 808, the computing system can project the image parts into the three-dimensional mesh.

At 810, the computing system can remove one or more objects from the reconstructed environment to generate an augmented environment. The one or more objects can include other architectural structures, trees, sidewalks, and other obstructing objects. The removal can be completed automatically or can include obtaining user inputs to remove one or more features in the mesh.

At 812, the computing system can store the augmented environment. The augmented environment can be compressed before being stored and may be stored in a three-dimensional asset database.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, the method comprising:

obtaining, by a computing system comprising one or more processors, a three-dimensional model that models a plurality of locations;

generating, by the computing system and based on the three-dimensional model, one or more three-dimensional meshes of a particular location of the plurality of locations;

processing, by the computing system, one or more images to generate one or more segmented images of the particular location;

projecting, by the computing system, the one or more segmented images to the one or more three-dimensional meshes to generate a location-specific segment, wherein the location-specific segment comprises a reconstructed environment associated with the particular location;

generating, by the computing system, the location-specific video of the particular location based on the location-specific segment, wherein the location-specific video comprises a plurality of different perspective views of the location-specific segment;

storing, by the computing system, the location-specific video of the particular location in a three-dimensional asset database; and storing the location specific segment with the location-specific video in the three-dimensional asset database.

2. The method of claim 1, further comprising: augmenting, by the computing system, the reconstructed environment to remove one or more objects from the reconstructed environment to generate the location-specific segment, wherein the location-specific segment is descriptive of a three-dimensional representation of an augmented environment.

3. The method of claim 1, wherein generating, by the computing system, the location-specific video of the particular location based on the location-specific segment comprises:

generating, by the computing system, a plurality of renderings of the location-specific segment; and generating, by the computing system, the location-specific video based on the plurality of renderings.

4. The method of claim 1, wherein the particular location is associated with a particular structure.

5. The method of claim 1, further comprising:

obtaining, by the computing system, data associated with the particular location; and wherein the three-dimensional model is obtained based on the data associated with the particular location.

6. The method of claim 1, further comprising:

obtaining, by the computing system, data associated with the particular location; and wherein the one or more three-dimensional meshes are generated based on the data associated with the particular location.

7. The method of claim 1, further comprising:

obtaining, by the computing system, data associated with the particular location;

obtaining, by the computing system, the one or more images based on the data associated with the particular location; and wherein the one or more segmented images are segmented based on the data associated with the particular location.

8. The method of claim 1, further comprising:

obtaining, by the computing system, a search query associated with a user computing device;

processing, by the computing system, the search query to determine the search query is associated with the particular location;

obtaining, by the computing system, the location-specific video from the three-dimensional asset database based on the search query being associated with the particular location; and providing, by the computing system, the location-specific video for display.

9. The method of claim 1, wherein the three-dimensional model comprises lidar data generated with a light detection and ranging sensor.

10. A computing system, the system comprising:

one or more processors; and one or more non-transitory computer-readable media that collectively store instructions that, when executed by the one or more processors, cause the computing system to perform operations, the operations comprising:

obtaining a three-dimensional model that models a plurality of locations;

generating, based on the three-dimensional model, one or more three-dimensional meshes of a particular location of the plurality of locations;

processing one or more images to generate one or more segmented images of the particular location;

projecting the one or more segmented images to the one or more three-dimensional meshes to generate a location-specific segment, wherein the location-specific segment comprises a reconstructed environment associated with the particular location;

generating the location-specific video of the particular location based on the location-specific segment, wherein the location-specific video comprises a plurality of different perspective views of the location-specific segment;

storing the location-specific video of the particular location in a three-dimensional asset database; and storing the location specific segment with the location-specific video in the three-dimensional asset database.

11. The system of claim 10, wherein the particular location is associated with an architectural structure.

12. The system of claim 11, wherein the location-specific video comprises a plurality of different perspective views of the architectural structure.

13. The system of claim 10, wherein the three-dimensional model is generated based on geographic data, wherein the geographic data comprises vector data.

14. The system of claim 13, wherein the vector data comprises one or more vector representations of one or more buildings.

15. The system of claim 10, wherein the three-dimensional model is generated based on geographic data, wherein the geographic data comprises geographic imagery, vector data, and point of interest data.

16. One or more non-transitory computer-readable media that collectively store instructions that, when executed by one or more computing devices, cause the one or more computing devices to perform operations, the operations comprising:

obtaining a three-dimensional model that models a plurality of locations;

generating, based on the three-dimensional model, one or more three-dimensional meshes of a particular location of the plurality of locations;

processing one or more images to generate one or more segmented images of the particular location;

projecting the one or more segmented images to the one or more three-dimensional meshes to generate a location-specific segment, wherein the location-specific segment comprises a reconstructed environment associated with the particular location;

generating the location-specific video of the particular location based on the location-specific segment, wherein the location-specific video comprises a plurality of different perspective views of the location-specific segment;

storing the location-specific video of the particular location in a three-dimensional asset database; and storing the location specific segment with the location-specific video in the three-dimensional asset database.

17. The one or more non-transitory computer-readable media of claim 16, wherein the one or more images comprise satellite imagery and street-level imagery.

18. The one or more non-transitory computer-readable media of claim 16, wherein the three-dimensional model spans a plurality of addresses.

19. The one or more non-transitory computer-readable media of claim 16, wherein the three-dimensional model spans a plurality of streets.

\* \* \* \* \*